(12) United States Patent
Abel et al.

(10) Patent No.: US 7,349,748 B2
(45) Date of Patent: Mar. 25, 2008

(54) DEVELOPMENT SYSTEM FOR PROCESS CONTROL SYSTEMS AS WELL AS ASSOCIATED METHOD AND COMPUTER PROGRAM PRODUCT

(75) Inventors: Dirk Abel, Aachen (DE); Hubert Bellm, Stutensee (DE); Ulrich Epple, Asslar-Berghausen (DE); Herbert Grieb, Malsch (DE); Ansgar Münnemann, Aachen (DE); Philipp Orth, Aachen (DE); Bernd-Markus Pfeiffer, Wörth (DE); Gerd-Ulrich Spohr, Mettmann (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 11/315,389

(22) Filed: Dec. 22, 2005

(65) Prior Publication Data

US 2006/0190098 A1 Aug. 24, 2006

(30) Foreign Application Priority Data

Feb. 21, 2005 (DE) ...................... 10 2005 008 136

(51) Int. Cl.
*G05B 19/42* (2006.01)
*G06F 3/048* (2006.01)
(52) U.S. Cl. ........................................ 700/86; 715/763
(58) Field of Classification Search ................... 700/86
See application file for complete search history.

(56) References Cited

U.S. PATENT DOCUMENTS

| | | | |
|---|---|---|---|
| 5,956,487 A * | 9/1999 | Venkatraman et al. ...... 709/218 |
| 6,192,390 B1 * | 2/2001 | Berger et al. ................ 709/200 |
| 6,259,958 B1 * | 7/2001 | Steinman et al. ............. 700/97 |
| 6,643,555 B1 * | 11/2003 | Eller et al. ..................... 700/83 |
| 6,775,579 B2 * | 8/2004 | Gasiorek et al. .............. 700/87 |
| 2005/0108265 A1 * | 5/2005 | Langkafel et al. .......... 707/101 |
| 2005/0160412 A1 * | 7/2005 | Thurner ...................... 717/148 |

FOREIGN PATENT DOCUMENTS

| | | |
|---|---|---|
| DE | 699 21 446 T2 | 10/2000 |
| DE | 103 57 276 A1 | 7/2005 |
| EP | 1 288 757 A1 | 3/2003 |
| WO | WO 00/05632 A1 | 2/2000 |

* cited by examiner

*Primary Examiner*—Thomas K. Pham

(57) ABSTRACT

The invention relates to methods and devices for developing programs for process control systems and in particular for mathematically intensive or, as the case may be, mathematically complex programs of said kind. According to the prior art programs of said kind were written in a separate development environment and subsequently the developed algorithm was re-implemented using a programming language available for the process control system and the associated compiler. The programming and testing were consequently both time-intensive and prone to error. It is proposed to split the overall algorithm into two parts when programming programs of said kind, a) the actual control algorithm by means of which the mathematical functionality of a controller is provided, and b) the algorithm by means of which the process control system-specific functionality of the above controller is provided. The second algorithm referred to runs in the process-oriented component of the process control system and the actual control algorithm in a computer suitable for industrial application. In order to control the process the two algorithms exchange data, the decision-making authority remaining at the control system level.

13 Claims, 1 Drawing Sheet

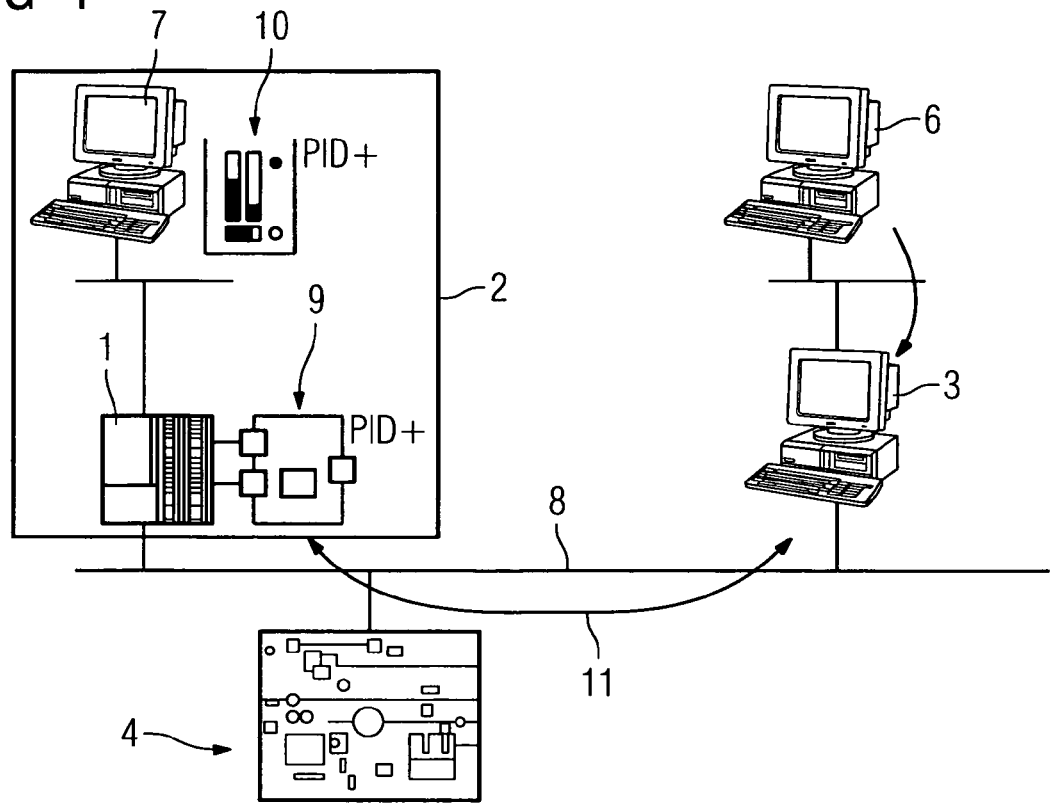
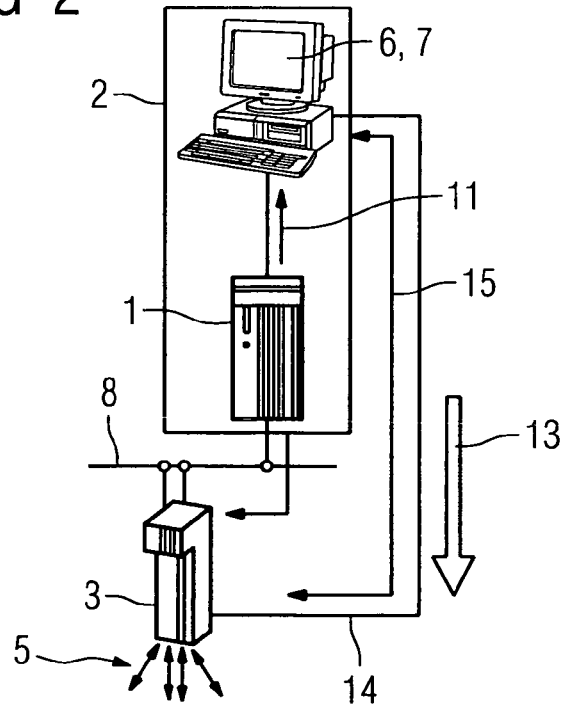

DEVELOPMENT SYSTEM FOR PROCESS CONTROL SYSTEMS AS WELL AS ASSOCIATED METHOD AND COMPUTER PROGRAM PRODUCT

CROSS REFERENCE TO RELATED APPLICATION

This application claims priority of the German application No. 10 2005 008 136.3 DE filed Feb. 21, 2005, which is incorporated by reference herein in its entirety.

FIELD OF THE INVENTION

The invention relates to process control systems and more particularly to devices and methods for developing and testing programs by means of which process control systems control and/or regulate processes. In particular the invention relates to the development of model-based and/or optimization-based programs for process control systems, e.g. predictive controllers, soft sensors or diagnostic methods.

BACKGROUND OF THE INVENTION

Process control systems are designed to control process-based installations and possess process-oriented components which are connected via a bus system to the components of the process to be managed or, as the case may be, controlled/regulated, such as, for example, actuators or sensors. In most cases the process control system has a control and monitoring station coupled to the bus system so that manual intervention in the process flow will be possible if the need arises.

The logic of the process control system (PCS) resides in the process-oriented component in the form of a computer program, hereinafter also referred to as a PCS program. According to the prior art, PCS programs of said type are programmed in an engineering system which provides different programming languages and editors for the standard automation functions and is directly connected to the process control system. Process control algorithms that are particularly complex mathematically or, as the case may be, sophisticated control and regulation techniques, on the other hand, are initially implemented and tested in a separate development and simulation environment which is physically separate from the process control system and also cannot exchange any data with said system. The development environment comprises a computer on which development and simulation software established for example under the Windows® operating system runs. A frequently deployed software package in this regard is called MATLAB/SIMULINK® and originates from the company MathWorks based in Natick, Mass., USA.

However, programs created using MATLAB/SIMULINK® are intended for processing by microprocessors of the Intel family under MS Windows without realtime requirements. For this reason they cannot be processed by the hardware of a process control system. Rather, it is necessary, upon completion of the preliminary work in the simulation environment, to re-implement the program created using MATLAB/SIMULINK® in a programming language that is available for the particular process control system.

This re-implementation cannot always be accomplished, in particular with complex control procedures or also with mathematically complex process control methods. One reason is that the hardware of the process control systems is limited in terms of its performance and to that extent quickly reaches its limits in such cases with regard to its computing power and its memory space. Another reason is that the above-mentioned compilers for process control systems, for example those for the high-level language SCL (Structured Text as defined in IEC 1131-3), do not have mathematical software libraries, e.g. for numerical techniques or matrix operations, in contrast to the above-mentioned MATLAB/SIMULINK® software package. Accordingly it is necessary to invest great effort, time and cost into reproducing missing libraries.

SUMMARY OF THE INVENTION

The invention is based on the technical problem of providing methods and devices by means of which the development of PCS programs and in particular mathematically complex PCS programs is simplified.

This technical problem is solved by the features of the independent claims. Advantageous developments are set forth in the dependent claims.

The invention is firstly based on the idea of splitting up the program code necessary for controlling/regulating a process or, as the case may be, the algorithm on which the program code is based into two parts. These parts are:
a) the actual control algorithm by means of which the functionality of a controller, for example a PID controller or a multi-variable controller, is provided,
b) the algorithm by means of which the process control system-specific functionality of the above controller is provided.

The actual control algorithm, for example the PID algorithm, may, if written in the C programming language, in certain circumstances be only a few kilobytes in size. Mathematically more demanding control algorithms, on the other hand, can be written faster and more efficiently using a commercially available development and simulation software such as, for example, the previously mentioned MATLAB/SIMULINK® program package. When the actual control algorithm is programmed, no consideration is given at that time that it will be run in a process control system.

The second-mentioned algorithm b) complements the actual control algorithm and takes into account that the entire program code will be executed in a process control system. Said algorithm adapts the program code to the hardware and functionality of the process control system. Toward that end the algorithm b) provides the following functions:
a) it fetches setpoint values for control variables from different sources and limits these or, as the case may be, their gradients ("setpoint value ramp"),
b) it handles the output of alarm messages if the need arises,
c) it enables the data exchange with a possibly present control and monitoring station assigned to the process control system,
d) it manages the various operating states of the controller such as initialization, synchronization, manual operation and automated operation, and, moreover, does so by way of a standardized state control unit,
e) it switches the components connected to the process control system into a safe state in the event of a failure of the control method.

The algorithm for providing the process control system-specific functionality of a controller can be loaded in the form of a program code into the internal memory of the process-oriented component of a process control system and executed by said component. Said program code represents a first computer program which runs in the process-oriented component of the process control system when the method according to the invention is performed.

The program code containing the actual control algorithm is referred to in the following as the second computer program. Said second computer program may possibly be an independently executable program, but may also be a non-independently executable program module which is used by a higher-ranking program component. The second computer program is executed on a commercially available computer and in particular a computer in a design suitable for industrial application. Said computer is also referred to in the following as the first computer. Suitable computers for this purpose are, for example, the commercially marketed computer models "Simatic Box PC" or "AddFEM Power". The advantages of using said computers in relation to the present invention will be dealt with in more detail below.

The first and the second computer program are used jointly to control or regulate the respective process. In the course thereof a reciprocal exchange of data takes place.

Toward that end it is provided that the process control system and the first computer are in each case connected to a data bus, in particular a fieldbus. In this way it can be provided that the process control system is connected to a fieldbus such as the PROFIBUS as the master and the first computer as a slave. With this arrangement the decision-making authority remains on the control system side.

During the data exchange via the data bus, actual values of process parameters, for example, are transmitted to the first computer, and specifically either directly from the process to the first computer or else indirectly from the process to the process control system and from there via the data bus to the first computer. Conversely, control values are transferred via the data bus from the first computer to the process, and specifically directly or indirectly as described above.

In a direct data transfer from the process to the first computer fast access times to process variables can be achieved. Particularly suitable for this purpose is, for example, the above-mentioned computer model "AddFEM Power", because it has a very fast input/output interface. This enables the first computer to directly access the analog or digital process signals.

As can be seen from the above explanations, a data exchange between the first and the second computer program must be ensured. The second computer program is embodied for this purpose and accordingly has suitable program components, for example in the form of a communication module. The data exchange is optimally implemented using a functionally standardized interface with the use of a standardized formal state control unit. This avoids the need to implement communication mechanisms afresh on an application-specific basis for each project.

In the above-mentioned data exchange the exchanged data can be process values supplied to the second computer program. Said process values are used, for example, as actual values for the actual control algorithm which for its part calculates control values for control variables. Said control values are conveyed as a data stream to the process control system and used as intended by the first computer program residing therein for controlling the process, usually an industrial process.

The above described system for performing the method is preferably assigned a process control system. The first computer program can then be loaded into the process-oriented component of the process control system and executed. In addition the process control system has a control and monitoring station which is connected to the process-oriented component. In this way it is possible to manually predefine setpoint values or manual control variables which are transferred via the process-oriented component and the fieldbus to the first computer.

The process control system is assigned a second computer which is embodied for the purpose of developing realtime-capable second computer programs thereon. Toward that end the second computer can have the above-mentioned MATLAB/SIMULINK® program package by means of which on the one hand the actual control algorithm can be developed and on the other hand said control algorithm can be converted into a realtime-capable code. The second computer can additionally download the realtime-capable program code or, as the case may be, the second computer program onto the first computer via a data link.

In the last-mentioned embodiment the system according to the invention is a complete development environment by means of which control programs for process control systems can be developed and tested. In this case the programming is done exclusively on the said second computer, for example under MATLAB/SIMULINK®, and, what is more, in particular only once without a subsequent re-implementation using a programming language for process control systems. This considerably simplifies development, as well as making it faster and less prone to error.

As the second computer program can run on a commercially available computer, for example a standard PC based on an Intel processor, the above-mentioned restrictions as a consequence of limited computing power and limited memory space of the process control system are also removed in an economical manner.

In addition further advantages result from the fact that the software libraries on the second computer, e.g. those of the MATLAB/SIMULINK® program package, are incomparably more powerful than those of native compilers for process control systems. As a result, on the one hand the programming is simplified, and on the other certain programming techniques are actually made possible for the first time.

The method according to the invention is preferably performed in such a way that further program code is dynamically loaded onto the first computer while the second computer program is running. As described above, the program code is dynamically loaded from the second computer on which the programming is performed under MATLAB/SIMULINK®. This has the advantage that a software update can take place while the process is running. This avoids the disadvantage that in order to update the entire program for controlling the process, the process has to be stopped and restarted. In, this way outage times of the associated industrial plant are avoided.

The method can also be operated in such a way that at least two different program codes or, as the case may be, two different second computer programs are held switchably in readiness simultaneously with respect to one another on the first computer, as a result of which the system is configured with partial redundancy.

As can be seen from the above explanations, the method according to the invention can be performed at least partially by means of a computer program or, as the case may be, is performed at least partially by means of a computer program. In this case the computer program can be stored, as is generally customary, on a computer-readable medium, such as a CD or a DVD, or transmitted by means of an electrical signal sequence via a data network such as the Internet.

BRIEF DESCRIPTION OF THE DRAWINGS

The invention will be explained in more detail below with reference to an exemplary embodiment in conjunction with the figures, in which:

FIG. 1 shows a first embodiment of the system according to the invention, and

FIG. 2 shows a second embodiment of the system according to the invention.

DETAILED DESCRIPTION OF THE INVENTION

FIG. 1 shows a first embodiment of the system according to the invention. This comprises a process control system 2 of the Simatic PCS7 type, as marketed commercially by the applicant. This possesses a process-oriented component 1 and a control and monitoring station 7. In this arrangement the process-oriented component 1 is a Simatic S7 controller and the control and monitoring station 7 a standard PC running the Simatic WinCC software under Windows 2000 or XP. The two are connected to one another via a system bus (e.g. Industrial Ethernet). The process control system 2 serves to control a process 4.

A first computer program which is indicated by a symbol 9 resides in a memory area of the process-oriented component 1. In this case said program is the computer program PID+, which maps the process control system-specific functionality of a controller framework, i.e. setpoint value preprocessing, control variable postprocessing, operating mode switchovers, alarm and reporting behavior, and moreover for single-variable or multi-variable scenarios. A symbol 10 further indicates that the first computer program can be controlled and monitored via the control and monitoring station 7 using a preconfigured, standardized control image (faceplate).

A first computer 3 is connected as a slave to the PROFIBUS 8. Said first computer 3 is an industrial grade Simatic Box PC commercially marketed by the applicant. Certified to protection class IP 20, said PC is particularly robust with regard to electromagnetic compatibility, temperatures, vibration and shock behavior. A second computer program runs thereon in the form of a machine-dependent program code. The latter can be downloaded from the second computer 6, as indicated by the arrow. The second computer 6 is a standard Windows PC which does not have to fulfill any special requirements. The MATLAB/SIMULINK® development environment runs on this PC. In operation the first and the second computer program are executed simultaneously, exchanging data with one another, as indicated by the arrow 11.

A second embodiment of the system according to the invention is shown in FIG. 2. Compared with the embodiment according to FIG. 1, in this arrangement the control and monitoring station 7 simultaneously acts as the second computer 6, with the result that to that extent the latter is saved. The process-oriented component 1 is a Simatic AS, marketed commercially by the applicant, which is connected to the PROFIBUS 8 as the master. The process-oriented component 1 transfers measured values of process variables to the second computer 6 via the system bus, as indicated by the arrow 11.

The second computer 6 is additionally connected to the first computer 3. On the one hand a data cable 14 permits the downloading of the first computer program in accordance with the above explanations, as indicated by the arrow 13. On the other hand the first and the second computer are connected via an RS232 link in order to exchange data with one another, as indicated by the double arrow 15.

The first computer 3 is an "AddFEM Power" computer, marketed commercially by the applicant, which has a fast I/O interface 5 to provide direct access to binary and analog signals of the process 4 requiring to be controlled.

The invention claimed is:

1. A system for process control system, comprising:
   a first computer;
   a first computer program that provides the process control system-specific functionality of a controller and is loaded into the process-oriented component of a process control system and executed; and
   a second computer program that is executable on the first computer, for controlling and/or regulating a process and the second computer program is embodied to execute a realtime-capable program code of a control algorithm for the controller on the first computer and to exchange data with the first computer program residing in a process control system.

2. The system as claimed in claim 1, wherein the exchanged data includes process values supplied to the second computer program.

3. The system as claimed in claim 1, wherein the exchanged data includes control values of control variables supplied to the first computer program.

4. The system as claimed in claim 1, wherein an input/output interface is provided for the first computer to allow direct access to analog and/or digital signals of the process that is to be controlled.

5. The system as claimed in claim 4, wherein the system is assigned a process control system and the process control system is assigned a second computer which is embodied for the development of algorithms for controllers for process control systems and for converting the algorithms into a realtime-capable program code, and for the downloading of the realtime-capable program code onto the first computer.

6. A method for developing a program for a process control system, comprising:
   providing a first computer program within a process-oriented component of a process control system, the first computer program providing the process control system-specific functionality of a controller;
   providing a second computer program on a first computer, the second computer program including an actual algorithm for the controller; and
   simultaneously executing the first and the second computer program while reciprocally exchanging data for controlling and/or regulating a process.

7. The method as claimed in claim 6, wherein the provisioning of the second computer program is accomplished by programming the underlying algorithm on a second computer, converting the same into a realtime-capable program code, and downloading the realtime-capable program code onto the first computer.

8. The method as claimed in claim 6, wherein during execution of the second computer program, the second computer program exchanges data with the first computer program.

9. The method as claimed in claim 8, wherein the exchanged data includes process values supplied to the second computer program.

10. The method as claimed in claim 8, wherein the exchanged data includes control values of control variables supplied to the first computer program.

11. The method as claimed in claim 8, characterized in that further program code is loaded onto the first computer dynamically during the runtime of the second computer program.

12. The method as claimed in claim 8, wherein at least two different second computer programs are held switchably in readiness simultaneously with respect to one another on the first computer.

13. A computer program product, comprising:
   a computer-readable medium;
   a computer program stored on the computer readable medium so that when the program is loaded into an internal memory of a computer a method is executed for developing a program for a process control system, comprising:

providing a first computer program within a process-oriented component of a process control system, the first computer program providing the process control system-specific functionality of a controller;

providing a second computer program on a first computer, the second computer program including an actual algorithm for the controller; and simultaneously executing the first and the second computer program while reciprocally exchanging data for controlling and/or regulating a process.

* * * * *